US006612214B2

(12) United States Patent
Neal

(10) Patent No.: US 6,612,214 B2
(45) Date of Patent: Sep. 2, 2003

(54) DIE CUTTER BLANKET-ANVIL LOCKING ARRANGEMENT

(75) Inventor: Kenneth Ray Neal, Magnolia, TX (US)

(73) Assignee: Robud, Pine Brook, NJ (US)

( * ) Notice: Subject to any disclaimer, the term of this patent is extended or adjusted under 35 U.S.C. 154(b) by 60 days.

(21) Appl. No.: 09/971,983

(22) Filed: Oct. 5, 2001

(65) Prior Publication Data

US 2003/0066402 A1 Apr. 10, 2003

(51) Int. Cl.[7] .................... B23D 25/12; B26D 1/56
(52) U.S. Cl. .................... 83/347; 83/659
(58) Field of Search .................... 83/374, 659, 375, 83/347

(56) References Cited

U.S. PATENT DOCUMENTS 3,602,970 A 9/1971 Smith
3,739,675 A 6/1973 Duckett et al.
3,765,329 A * 10/1973 Kirkpatrick et al. ...... 101/415.1
4,073,207 A 2/1978 Kirkpatrick
4,191,076 A * 3/1980 Bollmer et al. ................ 83/13
4,848,204 A 7/1989 O'Connor et al.
5,076,128 A * 12/1991 O'Connor et al. ............ 83/659
5,078,535 A * 1/1992 Kirkpatrick ................. 403/339
5,720,212 A * 2/1998 Kirkpatrick .................. 83/659
5,916,346 A 6/1999 Neal
6,135,002 A * 10/2000 Neal ........................... 83/659

* cited by examiner

*Primary Examiner*—Allan N. Shoap
*Assistant Examiner*—Ghassem Alie
(74) *Attorney, Agent, or Firm*—Carella, Byrne, Bain, Gilfillan, Cecche et al.; John G. Gilfillan, III; William Squire

(57) ABSTRACT

A molded anvil blanket is formed with a projection depending at each end, the ends for abutting when wrapped about the anvil, the anvil having a transverse channel for receiving the projections. The projections mate to form a common recess enclosed by a metal angle member secured to each projection. The angle member and projections have a transverse slot for mounting the blanket end and projections on a pneumatic mechanism attached to the anvil. The mechanism includes an air cylinder secured to the anvil in a radial anvil bore. The cylinder has a shaft which extends in response to pressurized air. A spring attached to the air cylinder and to a T-bar which releasably engages the blanket common recess normally biases the projections locked into the channel in a fail safe mode. The activated air cylinder lifts the projections out of the channel so the blanket ends can be manually released from the anvil by sliding the T-bar out of engagement with the projections via the slots in the projections and angle member.

23 Claims, 9 Drawing Sheets

DIE CUTTER BLANKET-ANVIL LOCKING ARRANGEMENT

This invention relates to securing arrangements for securing a die cutter blanket to an anvil about which the blanket is wrapped for use in a sheet material die cutting apparatus.

Die cutter blankets are thermoset molded urethane material that wrap about steel circular cylindrical anvils. The anvils typically have a longitudinal axially extending bore and a channel in the surface thereof extending along the anvil longitudinal axis. The blankets are wrapped about the anvil and have locking projections in some embodiments. The blankets are sheet material with opposing end edges at which the locking projections are located. The ends are complementary and the locking projections engage when inserted into the channel. The locking projections interlock when inserted into the anvil channel, locking the edges to the blanket and locking the blanket to the anvil and precluding the blanket from rotating about the anvil.

U.S. Pat. No. 3,765,329 discloses one aspect of a blanket with such projections. The plastic blanket has a sheet metal inner liner. The locking projections form a two part snap in construction in which a female part receives a male part, the female part depending from the blanket at one end edge thereof with a longitudinal rounded groove and the male part is complementary to the groove and snaps into the groove. The male part may be made of metal. The female part has a metal support. The male and female parts depend from the blanket edge for insertion into the anvil channel.

Other complementary locking structures are shown in U.S. Pat. Nos. 4,073,207, 4,848,204, 3,885,486, 4,867,024, 5,078,535, 5,720,212, 5,758,560, 5,916,346 and 6,135,002. All of the above patents use inerlocking complementary depending structures which fit into the anvil channel and cooperate with each other and the anvil channel to lock the blanket ends together and to the anvil in interference fit in the anvil channel. These require the projections to be force fit into the anvil channels to obtain the locking action. Typically the projections are hammered into the channel to interlock surface features of the mating projections or to interlock the projections with the channel. In addition, the projections may be bolted to the anvil channel using brackets.

Another locking arrangement for locking blanket ends together employs interlocking interdigitated fingers which are somewhat dovetail in shape. The interlocking fingers are in the same plane as the blanket sheet material and overlie the anvil. The anvil has a channel. The interlocking fingers overlie the channel. The blanket interlocking finger end portions have a depending projection which fits within the anvil channel to preclude the blanket from rotating relative to the anvil.

The problem with the above constructions is that the locking projections that are inserted into the anvil channels mate typically in interference fit. This requires the projections to be hammered into the anvil channel. This is cumbersome. Also, to remove the blanket requires a reverse process which is even more difficult because the blanket ends need to by pried out of the anvil channel. This is a labor intensive operation and costly to implement. The present inventor recognizes a need for a simpler and easier to install and uninstall blanket locking arrangement which is faster and more economical to implement.

According to the present invention the above problems are minimized by a die cutting anvil-blanket assembly comprising a plastic material die cutter blanket lying in a plane and having opposing ends, each end having a projection depending from the plane. A roller anvil has an outer surface and a longitudinal first bore defining an axis about which the anvil rotates, the anvil having an axially extending channel in the outer surface, the blanket being wrapped about the anvil with the opposing ends and projections abutting each other, the projections being located in the channel in a locked state. A pneumatic apparatus is secured to the anvil and is coupled to the blanket for selectively securing the projections in the channel in the blanket locked state and for selectively displacing the projections out of the channel to a blanket unlocked state.

In one aspect, the anvil includes a second radial bore in communication with the channel and with the anvil first bore, the pneumatic apparatus comprising an air cylinder secured to the anvil in the first bore and associated with the second bore for selectively displacing the blanket from the locked state to the unlocked state.

In a further aspect, the pneumatic apparatus includes a spring for normally biasing the blanket in the locked state.

In a further aspect, the air cylinder includes a shaft for extending in response to applied pressurized air, and a yoke secured to the air cylinder shaft, the yoke including a member releasably engaged with the projections for displacing the projections in response to displacement of the shaft.

In a still further aspect, the air cylinder includes a shaft, the pneumatic apparatus including a spring having a predetermined bias and coupled to the anvil and to the shaft, the shaft being retracted to the locked state in response to the bias of the spring and for extension to the unlocked state in response to pressurize air applied to the air cylinder against the spring bias.

In a further aspect, an interface member is secured to the anvil and arranged to secure the air cylinder thereto.

Preferably, the interface member comprises a first member secured to the anvil in the channel and a second member depending from the first member and located in the radial bore, the second member being secured to the air cylinder.

In a further aspect, the projections at each blanket end has a recess, the recesses of the projections cooperating with each other with the blanket ends abutting in the locked state to form a single recess, the pneumatic apparatus including a member releasably engaged with the single recess for displacing the projections to the locked and unlocked states.

In a further aspect, the projections each have a slot which slots cooperate to releasably receive the member.

In a further aspect, the blanket comprises a plastic sheet member lying in a plane and having first and second opposite ends, the sheet member for wrapping about the anvil with the ends abutting. A first projection depends from the first end and a second projection depending from the second end, the first and second projections each having a recess therein distal the plane, the recesses for forming a single complementary recess extending along the blanket ends and open at one recess side facing radially away from the plane of the sheet member with the ends abutting. A first member is attached to the blanket at the first end for forming a recess wall at the one recess side.

In a further aspect, a die cutter blanket anvil has a longitudinal axis about which the anvil rotates, the blanket having opposing ends and a depending projection at each end, the projections having a common cavity, the anvil outer peripheral surface having a channel extending transverse to the axis for receiving the projections in a blanket locked state. The anvil comprises an elongated first shaft having a longitudinally axially extending first anvil bore. A plurality of second radial bores are in the first shaft, each second bore in communication with the channel and with the first anvil bore. A pneumatic apparatus is attached to the anvil in the first anvil bore at each the second radial bores, the pneumatic apparatus has a second shaft which extends in the respective second radial bore in response to a pneumatic force applied thereto. A blanket engaging device is attached to the second shaft for releasably engaging the blanket opposing ends for lifting the projections out of the channel to a blanket unlocked state from a locked state in the channel in response to extension of the second shaft. A blanket engaging member is included in the device for retaining the projections in the channel in the blanket locked state to releasably lock the blanket to the anvil.

IN THE DRAWING

Figure 1:
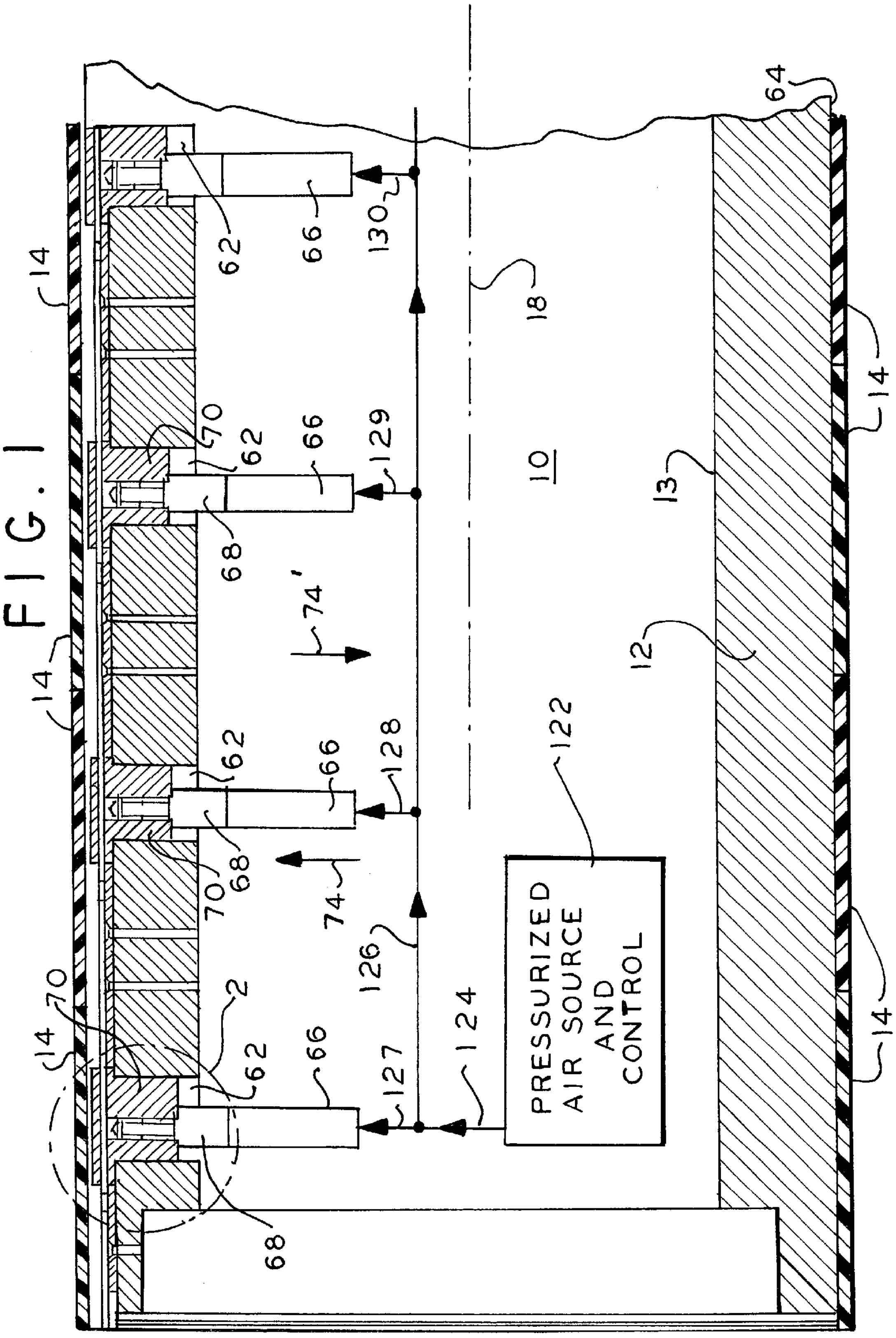
FIG. 1 is a side fragmented sectional elevation view of a blanket and anvil locking arrangement and assembly according to an embodiment of the present invention.

FIG. 1, assembly 10 in the present embodiment comprises a steel circular cylindrical anvil 12 having a longitudinal axis 18 and an axial array of abutting die cutter blankets 14 wrapped about the anvil 12. The assembly 10 is used in an apparatus in which dies (not shown) cut sheet material (not shown) moving over the rotating anvil 12 and blankets 14. In a die cutting process, blank sheet material such as cardboard and the like is die cut as the sheet material passes over the rotating blanket. The anvil 12, FIG. 3, has a channel 16 that extends for the length of the anvil along the anvil axis 18, FIG. 1. The channel 16 is square or rectangular in transverse section, FIG. 3, depending upon a given implementation. The anvil 12 is hollow and has an axially extending bore 13. Bearings (not shown) mount the anvil 12 upon a drive mechanism which rotates the anvil and attached blankets.

Figure 3:
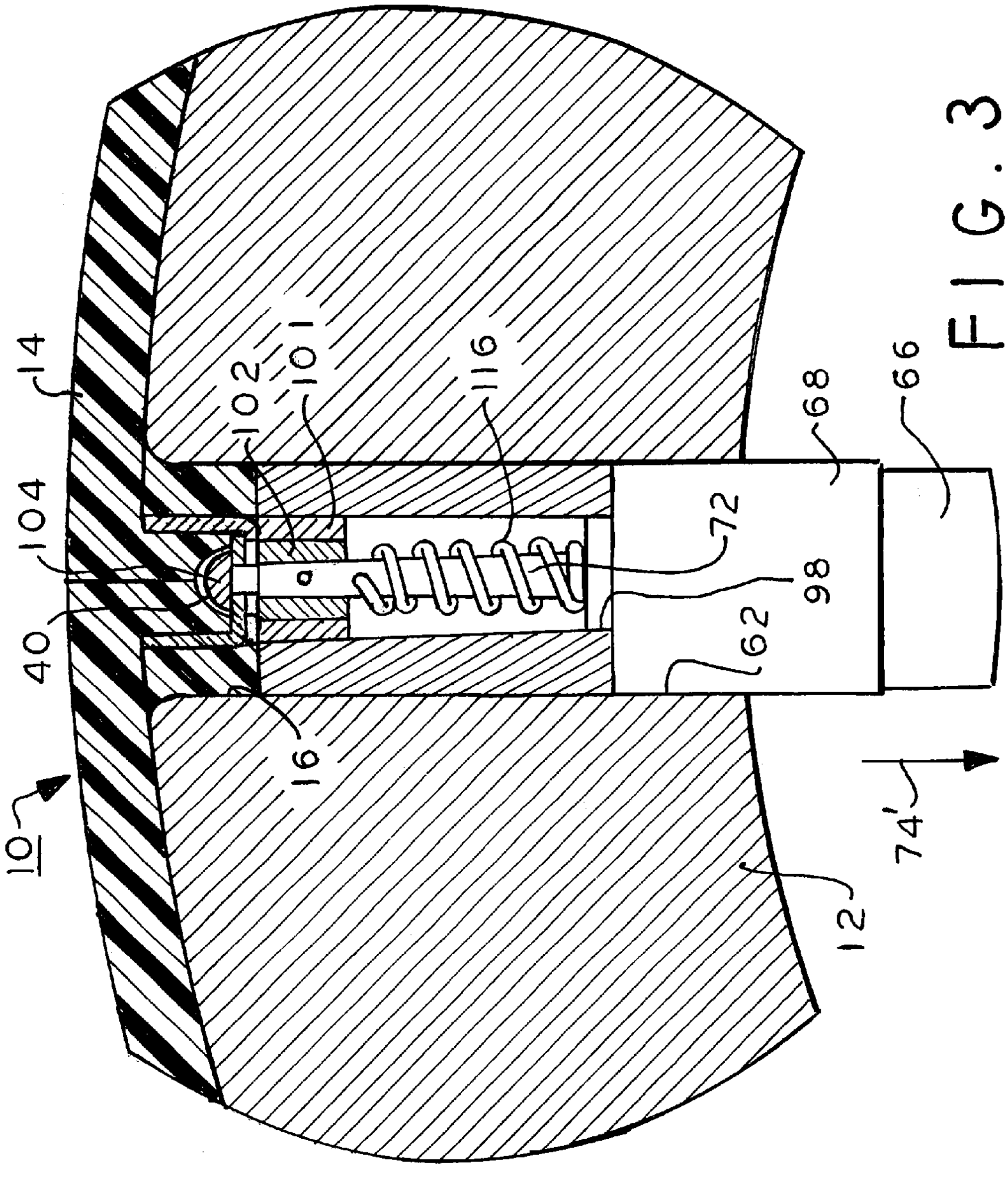
FIG. 3 is a more detailed fragmented sectional end view of the locking arrangement of the blanket to the anvil embodiment of FIGS. 1 and 2 in the closed locked state.
Figure 4:
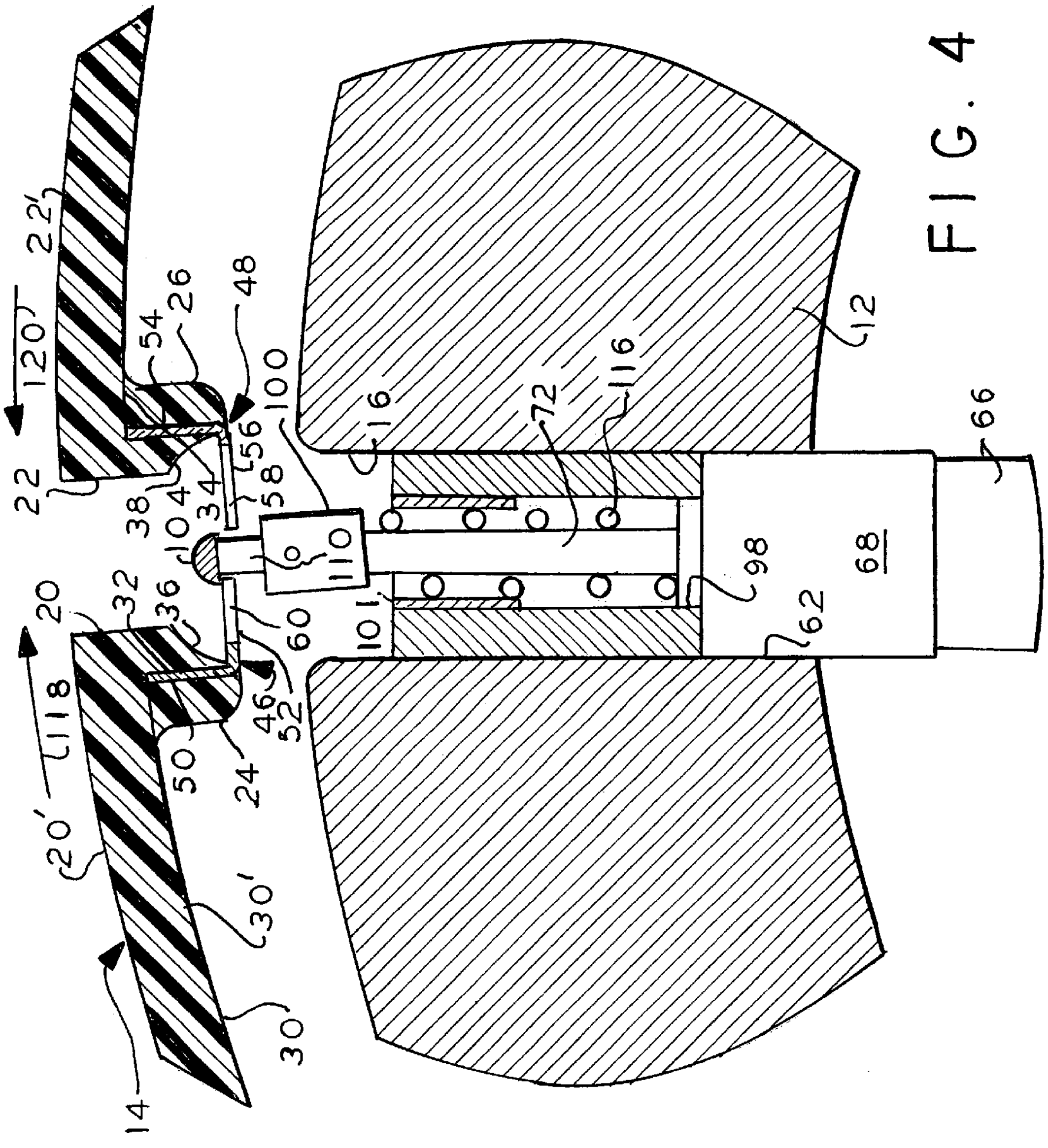
FIG. 4 is a view similar to that of FIG. 3 showing the locking arrangement in the open unlocked state.
Figure 10:
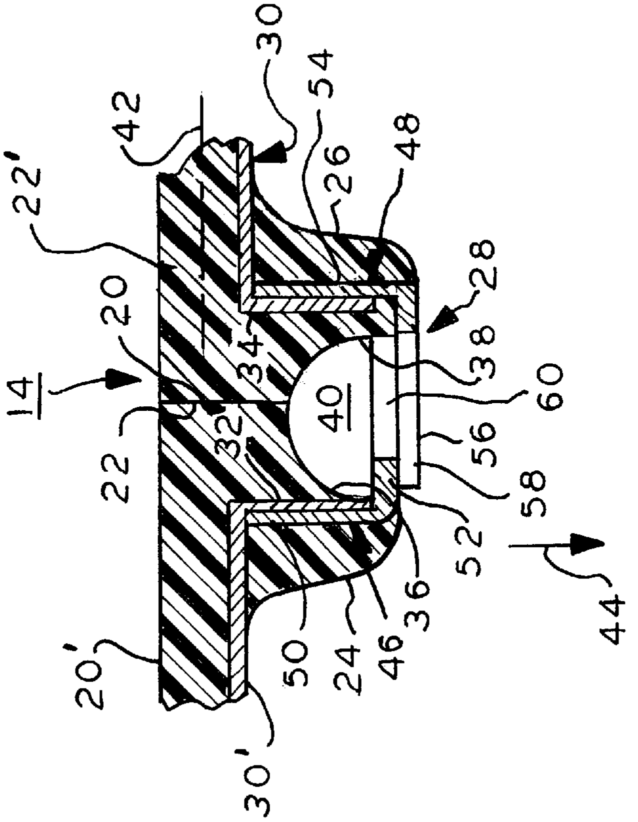
FIG. 10 is a fragmented sectional side elevation view of the abutting end edges of the blanket of the present invention.
Figure 6:
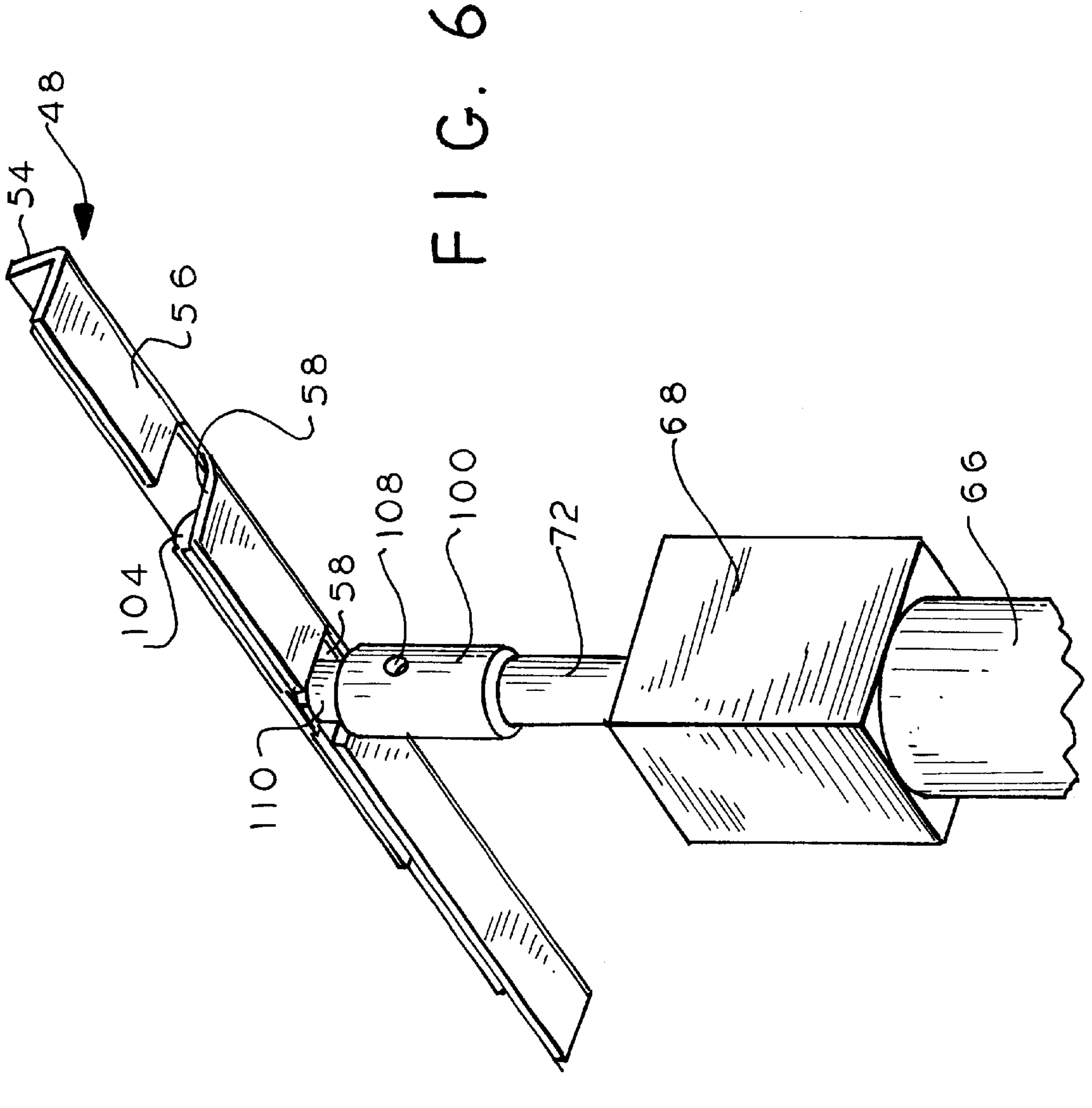
FIG. 6 is a view similar to that of FIG. 5 but showing also the engagement of the T-bar and yoke with metal angle portion of one of two end edges of the blanket of FIGS. 1 and 2.

Representative blanket 14, FIGS. 4 and 10, has identical end portions 20' and 22' as the other blankets 14. The blanket 14 is polyurethane plastic (thermoset plastic) molded sheet material that terminates at two end edges 20 and 22 at respective ends 20' and 22'. Two molded projections 24 and 26 depend from the respective ends 20' and 22'. The projections are complementary and form a composite single projection 28 (FIG. 10) complementary with the channel 16 (FIG. 3) for precluding rotation of the blanket 14 relative to the anvil 12 as the anvil rotates during the die cutting process. The projections are closely received in the channel 16, but are not in interference fit therewith. The projections could be slightly in interference fit with the channel 16 to assure a tight fit of the composite projection in the channel.

The blanket 14 and projections 24 and 26, FIG. 10, are molded attached to a sheet metal support liner 30. The liner 30 has a planar blanket support portion 30' which extends for the length of the blanket and two legs 32 and 34 bent at right angles to the planar portion 30', leg 32 being at end 20' and leg 34 being at end 22'. Projection 24 has an arcuate recess 36 and projection 26 has a mirror image arcuate recess 38, recesses 36 and 38 each being one fourth a circular cylinder in mirror image relation and forming a common semi-circular cylindrical cavity or opening forming a single recess 40, FIG. 10, with the ends 20' and 22' and projections abutting during engagement of the projections with the anvil 12 channel 16. The cavity or opening recess 40 faces in a radial direction 44 normal to and away from the plane 42 of the blanket 14. The molded plastic material forming the cavity or opening recess 40 is open in direction 44 except as provided by L-shaped members 46 and 48 which together cooperate to enclose the recess. The cavity or opening recess 40 extends along the length of the channel 16 (FIG. 3).

Member 46 has one leg 50 welded to the liner leg 32 and is encased in the molded plastic material of the projection 24. The other leg 52 extends across the common cavity or opening recess 40 to enclose the recess 40 at the otherwise open side distal the plane 42. The end edge of the leg 52 abuts projection 26, or in the alternative, may be spaced somewhat from the projection 26 to substantially enclose the cavity or opening recess 40 at the otherwise open side of the cavity or opening recess 40.

Member 48 similarly has one leg 54 welded to leg 34 of the liner 30' and a second leg 56 at a right angle to leg 54 which is juxtaposed with leg 52 of member 46. Members 46 and 48 preferably are steel. Legs 34 and 54 are encased by the plastic material of projection 26. Member 48 leg 56 has a slot 58 and member 46 leg 52 has a slot 60, the slots 58 and 60 being juxtaposed with the edges 20 and 22 abutting as shown in FIG. 10 and juxtaposed with a portion of the cavity or opening recess 40.

In FIG. 1, the anvil 12 has an axially extending array of, preferably twelve in this embodiment (only some of which are shown), identical radially oriented rectangular bores 62 in communication with the anvil 12 outer peripheral surface 64 and bore 13. An air cylinder 66 is associated with each bore 62. Each cylinder 66, FIGS. 1 and 2, has a member 68 that is secured to the anvil 12 via an interface member 70. Further, each air cylinder 66 has a shaft 72 and is a one way unit. This means that the shaft 72 is extended by applied pressurized air in only one direction, direction 74. When the pressure is removed the shaft is released and free to move in direction 74' opposite direction 74.

Figure 2:
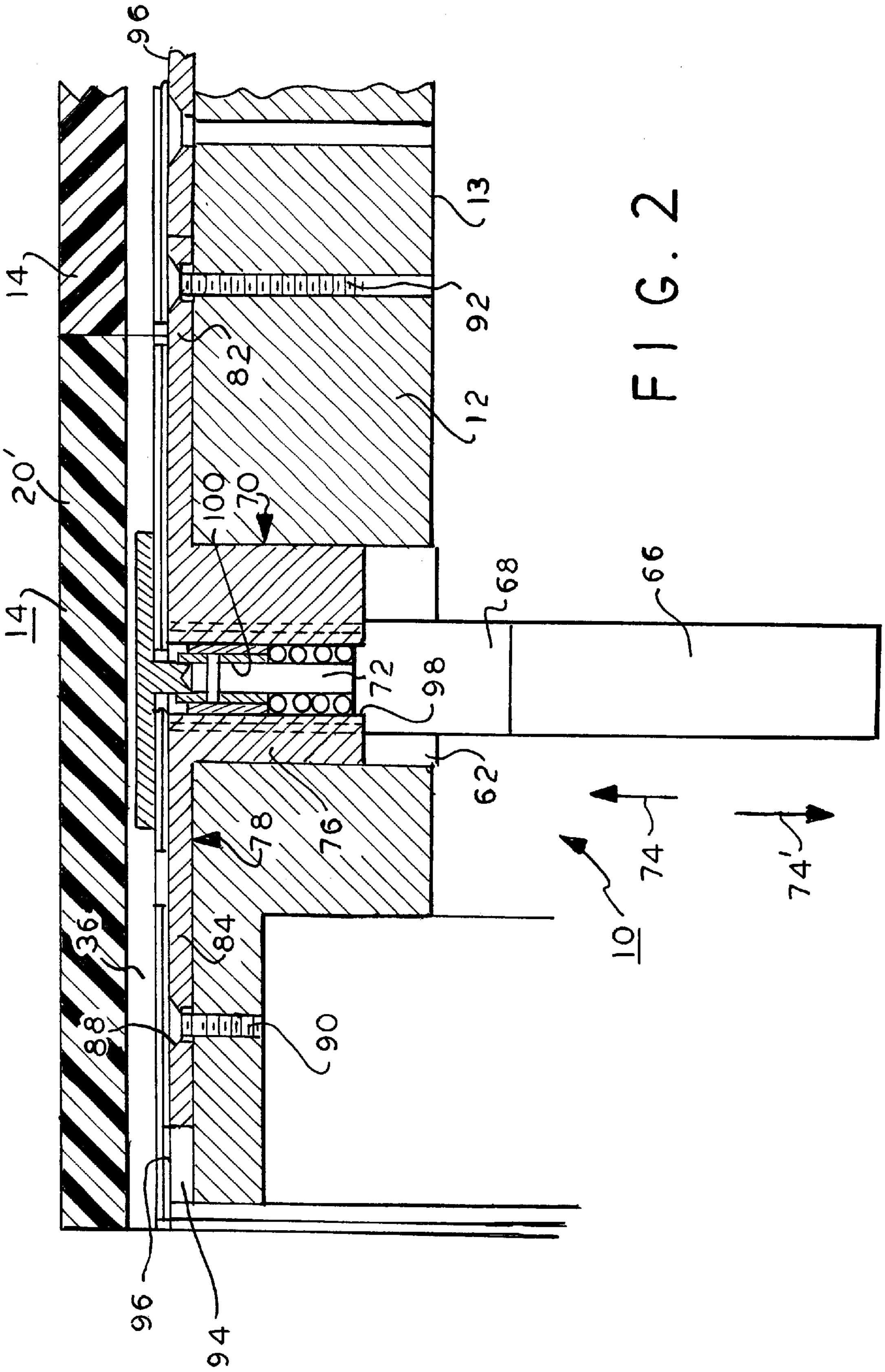
FIG. 2 is a more detailed view of the assembly of FIG. 1 taken at region 2.
Figure 7:
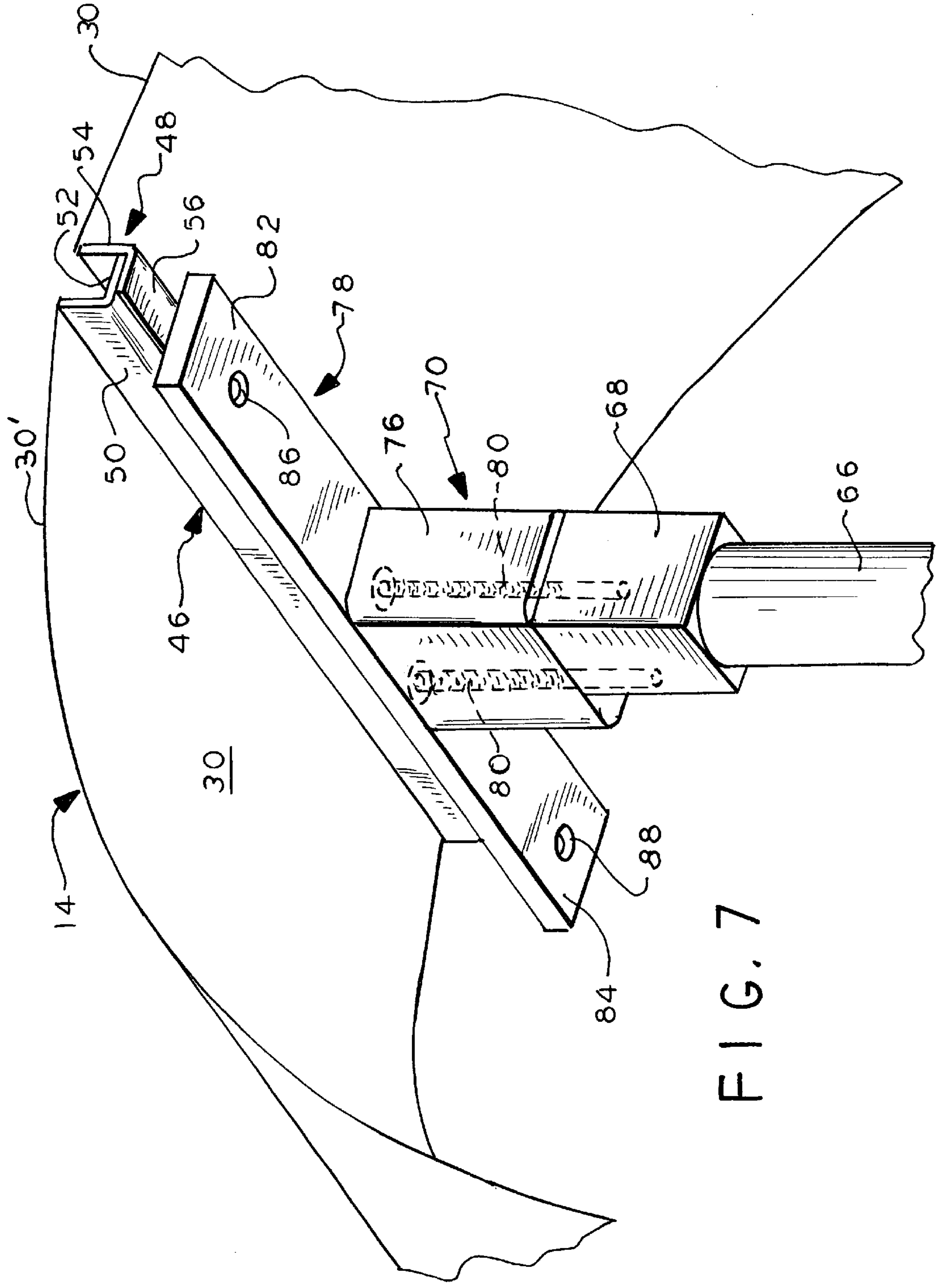
FIG. 7 is an isometric view of the air cylinder of the various figures coupled to a T-block which is fastened to the anvil and to the air cylinder and with a portion of the blanket metal liner and angled reinforcement metal members attached to the liner at the blanket end regions.

In FIGS. 2 and 7, the interface member 70 comprises a base member 76 and a cross member 78. In FIG. 7, only the liner 30 and the angled members 46 and 48 attached to the liner are shown for simplicity of illustration and to show the relationship of the parts. The base member 76 may be separate from the cross member 78 and attached by screws not shown. In the alternative, the base and cross members may be formed from one piece steel or aluminum. In FIG. 7, the interface member 70 is attached to the air cylinder member 68 by screws 80. The base member 76 is a rectangular in cross section block. The cross member 78 is a flat sheet member that is rectangular in cross section. The member 78 has arms 82 and 84. Arm 82 has a through hole 86 and arm 84 has a through hole 88. Screws 90, 92, FIG. 2, fasten the arms 82 and 84 via the holes 86, 88 to the anvil 12 in anvil recess 94 in the bottom wall 96 of the anvil channel 16. The base member 76 has a through bore 98.

Figure 8:
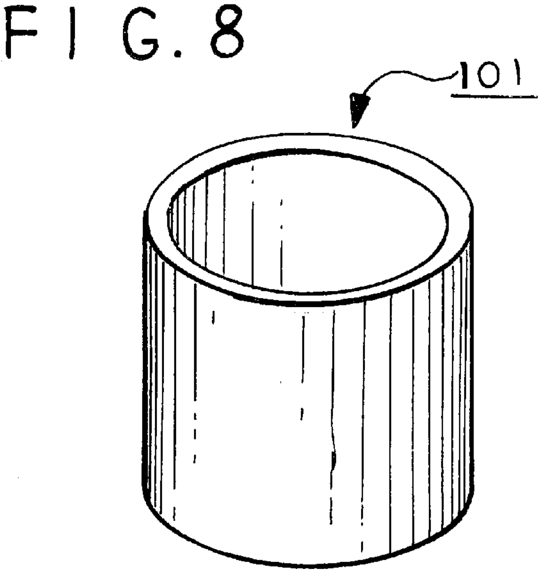
FIG. 8 is an isometric view of a bushing used with the embodiment of the present invention.

In FIGS. 3, 4 and 8, a circular cylindrical bushing 101 is mounted inside of the bore 98. The bushing may be mounted recessed so that it is flush with the interior wall of the bore 98 in a manner not shown. The bushing may be secured by press fit into the bore 98.

Figure 5:
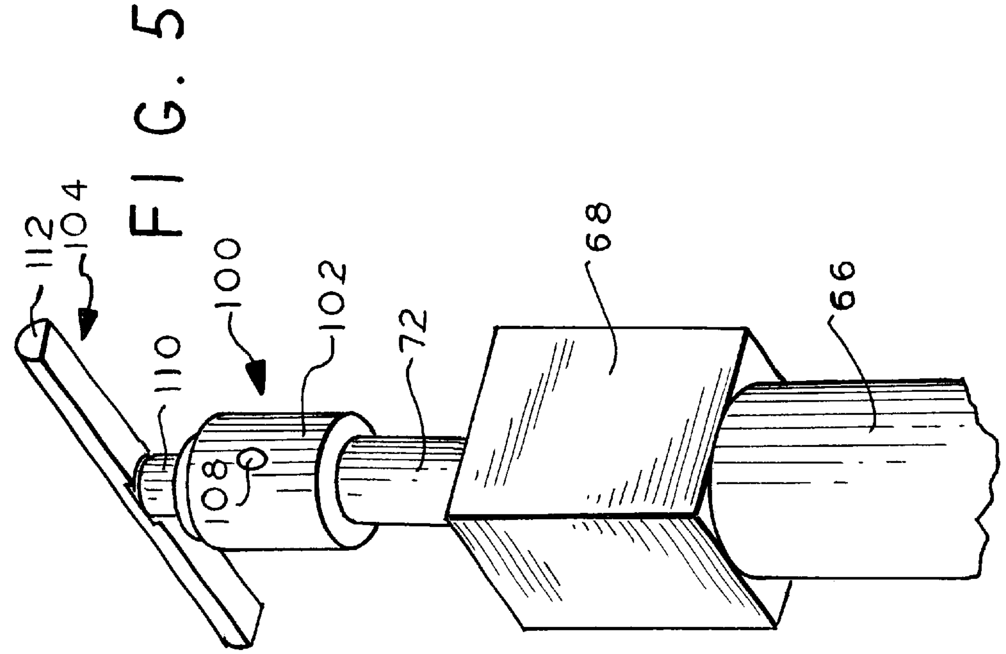
FIG. 5 is an isometric view of an air cylinder and T-bar and yoke used to open and close the locking arrangements of FIGS. 3 and 4
Figure 9:
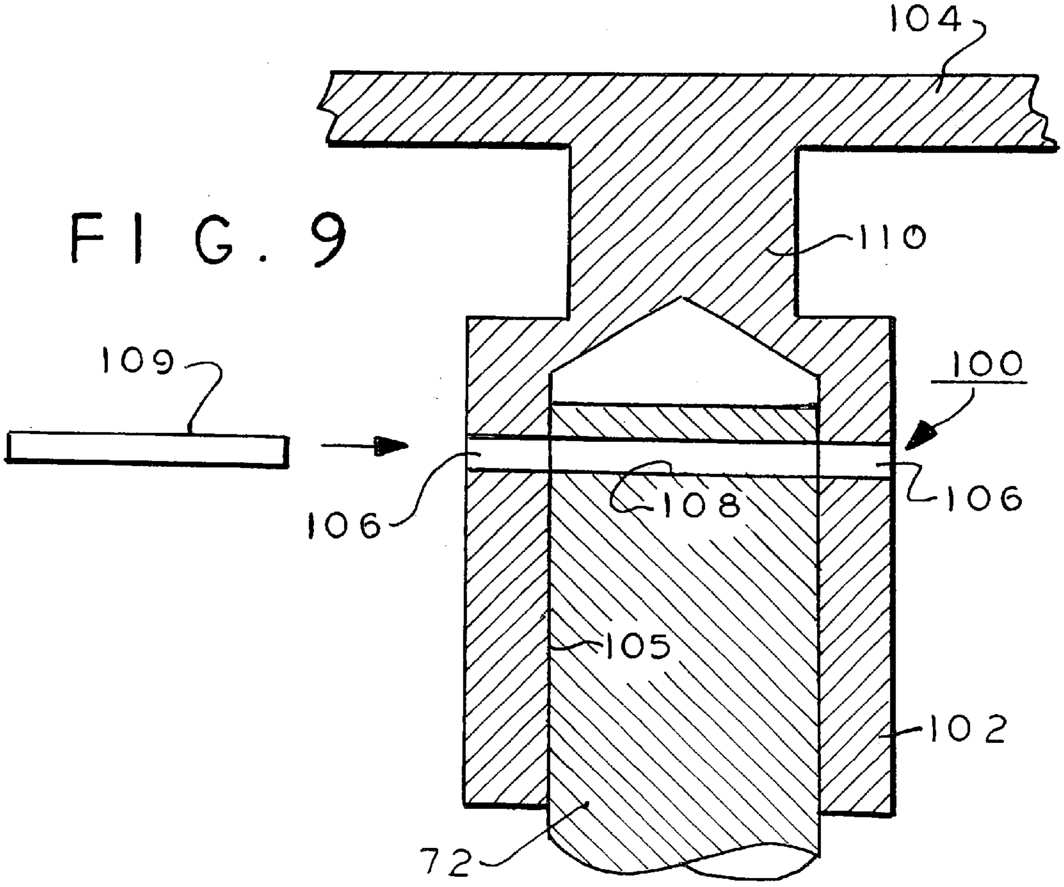
FIG. 9 is a more detailed fragmented side elevation sectional view of the T-bar and yoke of FIGS. 5 and 6.

In FIGS. 5 and 9, yoke assembly 100 includes a yoke 102 secured to a blanket engaging cross member 104 which may be one piece as shown or two pieces screwed together (not shown). The yoke 102 is a tubular circular cylindrical member with a central axial bore 105 and a transverse through bore 106 in opposite sides of the yoke 102 and aligned with each other to receive a pin 109. The bore 105 receives the shaft 72 of the air cylinder 66. The shaft 72 is secured to the yoke 102 by pin 109 passing through air cylinder shaft 72 bore 108 and secured in bores 106, by press fit, for example, or by screw threads (not shown).

The cross member 104 is secured to the yoke 102 by neck 110. The cross member 104 has a semi-circular cylindrical cross section 112 in end view as seen in FIG. 5. The cross member 104 fits within the cavity or opening recess 40 of the blanket projections 24, 26 (FIG. 10) as shown in FIG. 3 and is complementary in shape to the cavity or opening recess 40, e.g., partial-cylindrical. The cross member 104 is secured to the yoke 102 by neck 110. The cross member 104 has a semi-circular cylindrical cross section 112 in end view as seen in FIG. 5. The cross member 104 fits within the cavity or opening recess 40 of the blanket projections 24, 26 (FIG. 10) as shown in FIG. 3 and is complementary in shape to the cavity or opening recess 40, e.g., partial-cylindrical.

A coil compression spring 116 has one end secured to the air cylinder member 68, FIG. 3, and the other spring end is secured to the cylinder shaft 72 or in the alternative to the yoke 100. The spring 116 is normally biased in the quiescent position of FIG. 3 wherein the yoke is pulled downward by the spring in direction 74'. This locks the yoke assembly 100 cross member in the blanket locked position of FIGS. 1–3.

In operation, in FIG. 4, the air cylinder is extended by applying pressurized air to it. The pressurize air is applied simultaneously to all of the air cylinders in the array, FIG. 1. The control 122 couples a source of pressurized air to outlet line 124. Line 124 is connected by line 126 in parallel to the input lines 127–130 and so on of all of the air cylinders 66 of the array. The shafts 72 of all cylinders thus simultaneously extend to the blanket unlock state of FIG. 4. The blankets 14 are assembled one at a time to the anvil, the blanket 14 of FIG. 4 being representative.

A blanket 14 is wrapped loosely about the anvil in the desired axial position as shown in FIG. 4. The blanket ends 20' and 22' are spaced above the anvil in exaggerated form for purposes of illustration. The ends 20' and 22' are displaced in directions 118 and 120 toward one another in directions 118 and 120. The respective legs 52 and 56 of members 46 and 48 are also displaced in these directions. The respective slots 60 and 58 collectively receive the yoke assembly neck 110 during this displacement. The legs 52 and 56 overlap as displaced in these directions until the blanket ends edges 20 and 22 abut. The respective concave recesses 36 and 38 when abutting form the composite cavity or opening recess 40, FIG. 3. In this position, the locking cross member 104 of the yoke assembly 100 is located in the cavity or opening recess 40 and extends in the axial direction of axis 18 (FIG. 1) over the overlapping legs 52 and 54. The locking cross member 104 is also over the channel on either side of the anvil bore 62.

The remaining blankets 14 of the array are then assembled in sequence to the respective yoke assemblies of the array attached to the anvil 12 until all are in place with there end edges abutting as in FIG. 3 but spaced above the anvil as in FIG. 4. At this time the control 122, FIG. 1, is operated to remove the pressurized air from the line 124 and from the air cylinders 66 in the array. The springs 116 then automatically retract the yoke assemblies to the locked state position of FIG. 3 substantially at the same time as the pressure is removed from the air cylinders. This action forces the projections 24 and 26 into the anvil 12 channel 16 and locks the ends 20' and 22' of the blankets 14 of the array in the anvil channel 16, FIGS. 1–3. This provides a fail safe operation in case the pressurized air source and control 122 fail and pressurized air is lost. The springs 16 always keep the blanket in the locked state when pressure is not supplied to the air cylinders.

To place the blankets in the unlocked state, the pressurized air is once again applied to the various air cylinders 66 extending the shafts 72 of all of the cylinders to the unlocked state of FIG. 4. Selected ones of the blankets 14 are then removed and replaced by new blankets as needed.

While springs have been shown to provide a fail safe operation in case of loss of pressurized air, it will occur that a two way air cylinder that in response to pressurized air can be operated in two opposing directions. That is pressurized air is supplied to the cylinder in two opposite directions selectively by a control (not shown) to place the air cylinder shaft in either the locked or unlocked state. This avoids the use of the springs and may require additional pressurized air lines. However, in this case the fail safe feature is not provided. In addition, the two way operation may be provided the air cylinders in combination with the springs to provide the additional feature of pressurized air locking of the blankets if desired.

Figure 11:
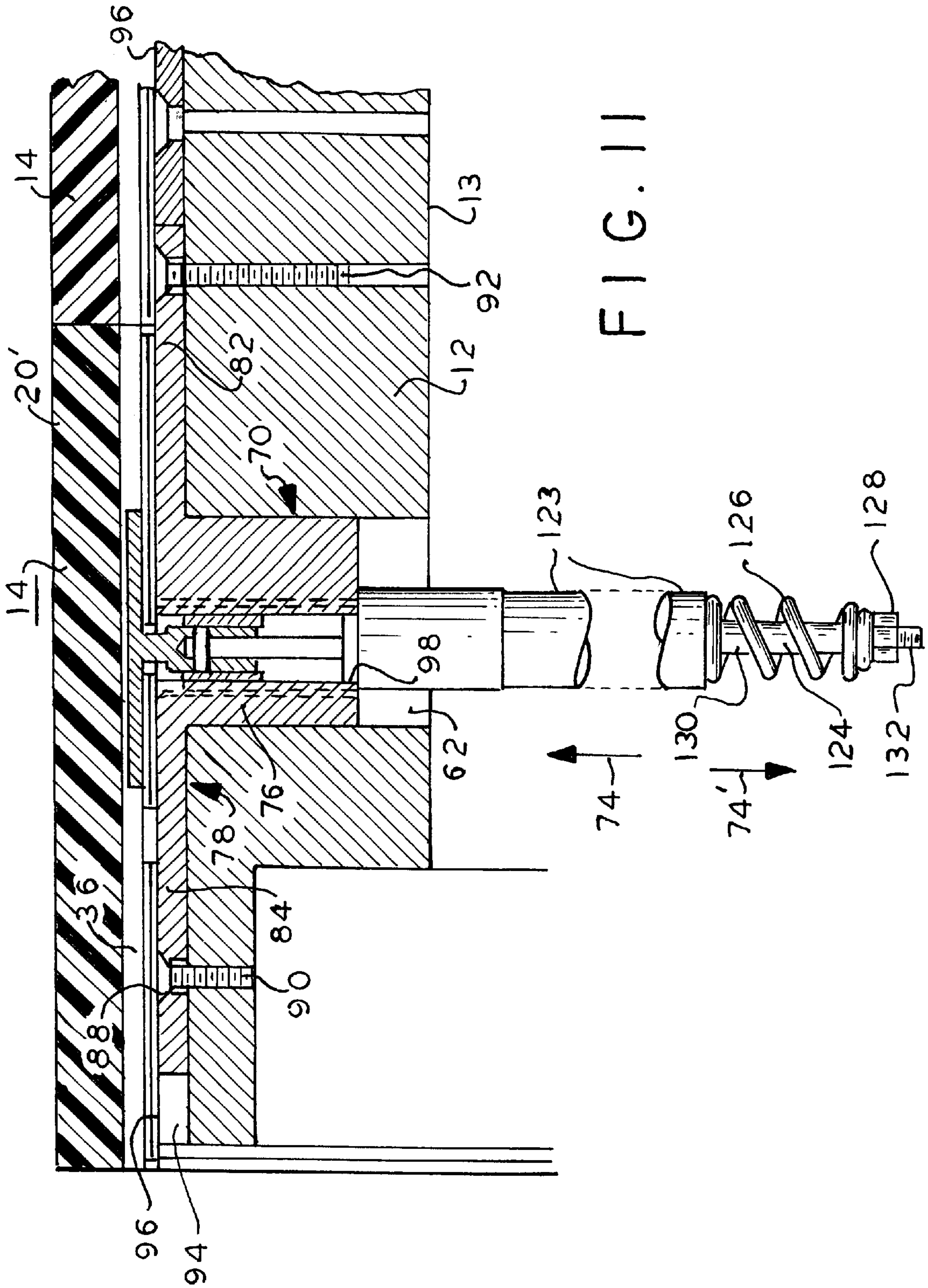
FIG. 11 is a view similar to that of FIG. 2 illustrating a further embodiment of the present invention in which the spring actuated air cylinder and spring is different than the spring and cylinder of the FIG. 2 embodiment.

In FIG. 11, the embodiment is similar to that of FIG. 2 except the air cylinder and spring are different. Parts with the same reference numerals are the same in the two figures. In FIG. 11, the air cylinder 123 has a shaft 124 that extends at portion 130 from the cylinder radially further into the anvil bore 13. The extended end 132 of the portion 130 is threaded and receives nut 128 to secure the spring 126 to the shaft 124. In this position the spring is extended in its quiescent position. When air pressure is applied to the cylinder 123, the shaft portion 130 retracts into the cylinder and the spring 126 compresses. When pressure is removed, the spring 126 returns the shaft portion 130 to the extended position of FIG. 11.

It will occur to one of ordinary skill in this art that still other various modifications may be made to the disclosed embodiment without departing from the spirit and scope of the invention. The disclosed embodiment is for illustration and not limitation. The invention is defined by the appended claims.

What is claimed is:

1. A die cutter blanket for use with an anvil having a longitudinal axis about which the anvil rotates, the anvil having a channel in the surface thereof extending transverse to the axis, the blanket comprising:

a plastic material sheet member lying in a plane and having first and second opposite ends, the sheet member for wrapping about the anvil with the ends abutting;

a first projection depending from the first end and a second projection depending from the second end, the first and second projections each having a recess therein distal the plane, the recesses for forming a single complementary recess extending along the blanket ends and open at one recess side facing radially away from the plane of the sheet member with the ends abutting; and a first member attached to the blanket at the first end for forming a recess wall at said one recess side, the first member having an edge, a slot in the first member forming a through opening in said recess wall at said one recess side in communication with the recess and in communication with the edge.

2. The blanket of claim 1 further including a second member attached to the blanket at the second end for overlying said first member.

3. The blanket of claim 2 wherein the second member has a through opening therein and forming a slot in communication with an edge of the second member, each first and second member slot being juxtaposed with each other for forming a through opening in said recess wall at said one recess side in communication with said recess.

4. The blanket of claim 1 wherein the first member is L-shaped having a first leg attached to the first projection generally transverse to the plane and a second leg forming said recess wall.

5. The blanket of claim 2 wherein the first and second members are L-shaped and each having a first leg attached to a different one of the respective first and second projections generally transverse to the plane and a second leg in said overlying relation.

6. The blanket of claim 5 wherein the blanket includes a metal liner attached to the sheet member, the liner having a third leg in the first projection and a fourth leg in the second projection, the first member attached to the third leg and the second member attached to the fourth leg.

7. The blanket of claim 2 wherein at least one of said first and second members is arranged to at least partially enclose said complementary recess.

8. A die cutter blanket anvil having a longitudinal axis about which the anvil rotates, the blanket having opposing ends and a depending projection at each end, the projections having a common cavity, the anvil outer peripheral surface having a channel extending transverse to the axis for receiving the projections in a blanket locked state, the anvil comprising:

an elongated first shaft having a longitudinally axially extending first anvil bore;

a plurality of second radial bores in the first shaft, each second bore in communication with said channel and with said first anvil bore;

a pneumatic cylinder attached to the anvil in said first anvil bore at each said second radial bores, said pneumatic cylinder having a second shaft which extends in the respective second radial bore in response to a pneumatic force applied thereto; and a blanket engaging device attached to the second shaft for releasably engaging the blanket opposing ends for lifting said projections out of said channel to a blanket unlocked state from a blanket locked state in the channel in response to the extension of said second shaft; and for retaining said projections in said channel in the blanket locked state to releasably lock the blanket to the anvil.

9. The anvil of claim 8 further including a resilient element coupled to the anvil for normally biasing the blanket engaging device to the blanket locked state, for retraction of the second shaft in a direction opposite to said extension and for displacing the projections into said channel.

10. The anvil of claim 8 wherein said pneumatic cylinder comprises an air cylinder responsive to selectively applied pressurized air.

11. The anvil of claim 9 wherein the resilient element comprises a spring coupled to the anvil.

12. The anvil of claim 10 wherein the air cylinder has a shaft extended by the applied pressurized air, the blanket engaging device including a yoke assembly comprising a yoke attached to the second shaft in said radial bore and extending in a first direction out of said radial bore and a blanket engaging member attached to the yoke extending in a second direction normal to the first direction for reception in the channel for engaging the blanket, the second shaft in response to the applied pressurized air extending to the blanket unlock state from the locked state, the blanket engaging device for causing the blanket engaging member to pull the projections into said channel to the blanket locked state and, in response to said second shaft extending, for pushing the projections out of the channel to the blanket unlocked state.

13. The anvil of claim 12 further including a base member in each said anvil radial bore and a transverse member attached to the base member and secured to the anvil in the channel, and a fastening device for securing the air cylinder to the base member.

14. A die cutting anvil-blanket assembly comprising:

a plastic sheet material die cutter blanket lying in a plane and having opposing ends, each end having a projection depending from the plane;

a roller anvil having an outer surface and a longitudinal first bore defining an axis about which the anvil rotates, the anvil having an axially extending channel in the outer surface, the blanket being wrapped about the anvil with the opposing ends and projections abutting each other, the projections being located in said channel in a locked state; and a pneumatic apparatus secured to the anvil and coupled to the blanket for selectively securing the projections in said channel in the blanket locked state and for selectively displacing said projections out of the channel to a blanket unlocked state.

15. The assembly of claim 14 wherein the anvil includes a second radial bore in communication with the channel and with the anvil first bore, the pneumatic apparatus comprising an air cylinder secured to the anvil in the first bore and associated with the second bore for selectively displacing said blanket from the locked state to the unlocked state.

16. The assembly of claim 14 wherein the pneumatic apparatus includes a spring for normally biasing the blanket in the locked state.

17. The assembly of 15 wherein the pneumatic apparatus includes a spring for normally biasing the projections in the locked state.

18. The assembly of claim 17 wherein the air cylinder includes a shaft for extending in response to applied pressurized air, and a yoke secured to the air cylinder shaft, the yoke including a blanket locking member releasably engaged with the projections for displacing the projections and blanket ends in response to displacement of the shaft to the unlocked state.

19. The assembly of claim 15 wherein the air cylinder includes a shaft, the pneumatic apparatus including a spring having a predetermined bias and coupled to the anvil and to said shaft, said shaft being retracted to the locked state in response to the bias of said spring and for extension to the unlocked state in response to pressurize air applied to the air cylinder against the spring bias.

20. The assembly of claim 15 including an interface member secured to the anvil and arranged to secure the air cylinder thereto.

21. The assembly of claim 20 wherein the interface member comprises a first cross member secured to the anvil in the channel and a second base member depending from the first member and located in the radial bore, the second base member being secured to the air cylinder.

22. The assembly of claim 14 wherein the projections at each end has a recess, the recesses of the projections cooperating with each other with the blanket ends abutting to form a single recess opening, the pneumatic apparatus including a blanket locking member releasably engaged with said single opening recess for displacing the projections and blanket ends to the locked and unlocked states.

23. The assembly of claim 22 wherein the projections each have a slot which slots cooperate to releasably receive the blanket locking member.

* * * * *